United States Patent
Chen et al.

(10) Patent No.: US 11,243,723 B2
(45) Date of Patent: Feb. 8, 2022

(54) DIGITAL REPRESENTATION

(71) Applicant: Hewlett-Packard Development Company, L.P., Spring, TX (US)

(72) Inventors: Eli Chen, Nes Ziona (IL); Oren Haik, Nes Ziona (IL); Oded Perry, Nes Ziona (IL)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/965,032

(22) PCT Filed: Mar. 8, 2018

(86) PCT No.: PCT/US2018/021616
§ 371 (c)(1),
(2) Date: Jul. 27, 2020

(87) PCT Pub. No.: WO2019/172916
PCT Pub. Date: Sep. 12, 2019

(65) Prior Publication Data
US 2021/0109686 A1    Apr. 15, 2021

(51) Int. Cl.
*G06K 15/00* (2006.01)
*G06F 3/12* (2006.01)
*G06K 9/32* (2006.01)

(52) U.S. Cl.
CPC .......... *G06F 3/121* (2013.01); *G06K 9/3275* (2013.01)

(58) Field of Classification Search
None
See application file for complete search history.

(56) References Cited

U.S. PATENT DOCUMENTS

| | | | |
|---|---|---|---|
| 5,901,253 A | 5/1999 | Tretter | |
| 6,430,320 B1* | 8/2002 | Jia | H04N 1/38 382/289 |
| 6,956,587 B1 | 10/2005 | Anson | |
| 8,009,931 B2 | 8/2011 | Li et al. | |
| 8,064,729 B2 | 11/2011 | Li et al. | |
| 8,120,810 B2 | 2/2012 | Hamzy | |
| 8,804,157 B2 | 8/2014 | Bockus, Jr. et al. | |
| 9,159,106 B1 | 10/2015 | Bodell et al. | |
| 9,710,203 B2 | 7/2017 | Van Acquoij | |
| 2003/0095722 A1* | 5/2003 | Regimbal | G06T 3/608 382/296 |
| 2007/0002404 A1* | 1/2007 | Mongeon | H04N 1/00031 358/504 |
| 2009/0041383 A1 | 2/2009 | Zhao et al. | |
| 2009/0185228 A1* | 7/2009 | Li | H04N 1/3873 358/3.06 |
| 2010/0097657 A1* | 4/2010 | Kuo | G06K 15/1247 358/3.01 |

(Continued)

FOREIGN PATENT DOCUMENTS

JP    H11277850 A    10/1999

*Primary Examiner* — Dung D Tran
(74) *Attorney, Agent, or Firm* — Middleton Reutlinger

(57) ABSTRACT

Examples of the present disclosure relate to a method for skew detection in a printing system. The method comprises printing a document from an original digital image, scanning the document to produce a digital representation using an in line scanner of the printing system, and detecting skew in the digital representation independently from the original digital image.

11 Claims, 6 Drawing Sheets

(56) References Cited

U.S. PATENT DOCUMENTS

| | | | |
|---|---|---|---|
| 2010/0141991 A1* | 6/2010 | Yoshida | H04N 1/3878 |
| | | | 358/1.15 |
| 2011/0149331 A1 | 6/2011 | Duggan et al. | |
| 2012/0081450 A1* | 4/2012 | Nakano | B41J 11/46 |
| | | | 347/19 |
| 2012/0087596 A1* | 4/2012 | Kamat | G06T 1/20 |
| | | | 382/254 |
| 2015/0003845 A1* | 1/2015 | Morishita | G03G 15/55 |
| | | | 399/15 |
| 2015/0199119 A1 | 7/2015 | Ferguson et al. | |
| 2018/0222231 A1* | 8/2018 | Liu | B41J 29/38 |
| 2019/0124225 A1* | 4/2019 | Fujii | H04N 1/00748 |

\* cited by examiner

DIGITAL REPRESENTATION

BACKGROUND

Digital printing systems are complex. The printing quality may vary over time or from printing system to printing system, potentially resulting lower printing quality. At the same time, quality expectations are increasing.

BRIEF DESCRIPTION OF THE DRAWINGS

Various example features will be apparent from the detailed description which follows, taken in conjunction with the accompanying drawings, wherein:

FIG. 1b is a schematic illustration of a digital representation according to FIG. 1a.

FIGS. 2b-d are schematic illustrations of a digital representation according to FIG. 2a.

DETAILED DESCRIPTION

This disclosure relates to detecting skew or misalignment in a printing system. Skew or misalignment may occur for example if a printing media is misaligned with a printing engine, so that an image is not printed in the expected manner on the media, leading to potential quality issues. In some cases, such skew or misalignment may even lead to a system fault such as a so called paper jam. Such quality issues or even system fault may in some cases result very costly and time consuming, for example in the professional printing services industry. A system fault may for example lead to a manual intervention, and a printing system could print numerous documents of unacceptable quality which may have to be discarded if quality is not at the appropriate level due to skew or misalignment, leading to waste of consumables such as ink or printing media for example. Such documents may for example include product labels or high quality magazines. This disclosure aims at detecting such issues early in order to avoid printing numerous document of unacceptable quality, or to minimize a manual intervention for example. This disclosure aims at doing so in an efficient manner, using for example an in line scanner comprised in the printing system, the scanner capturing a digital representation of a document and detecting such skew or misalignment on this digital representation, without requiring to compare such digital representation to an original digital image, thereby avoiding having to compare formats which would likely be different between such original digital image and the digital representation, as well as avoiding transmitting both data of an original digital image and data of the digital representation to a same controller, and avoiding use of computing resources to compare different digital files to each other. The inclusion of scanning into the printing method permits monitoring the appearance of an issue on line rather than off line, leading for example to precious gain of time.

Figure 1A:
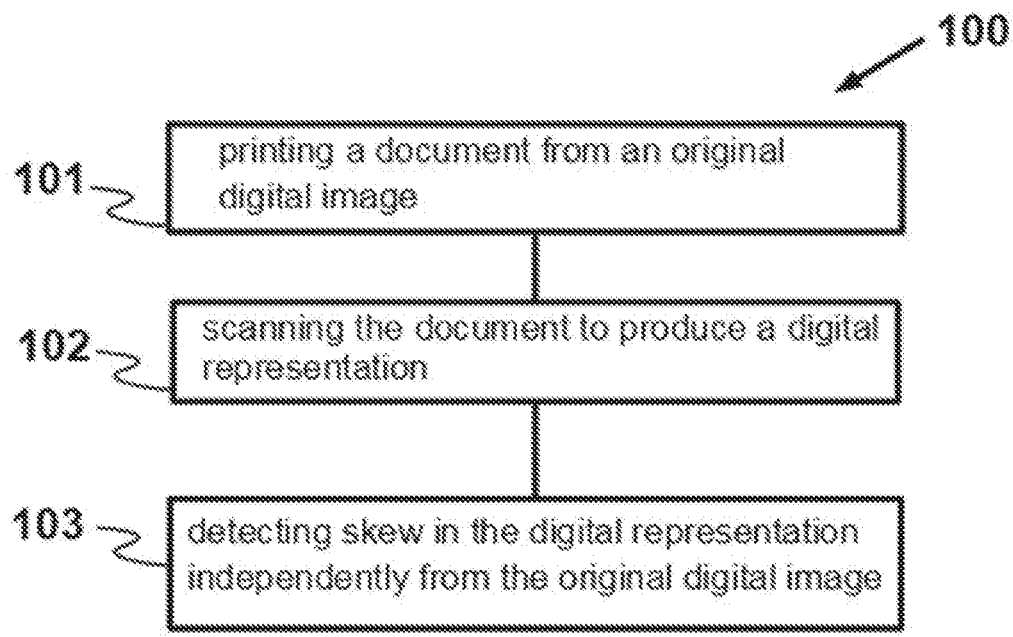
FIG. 1a is a schematic illustration of an example digital representation method according to the present disclosure.

FIG. 1a illustrates an example method 100 for skew detection in a printing system. Method 100 comprises in block 101 printing a document from an original image. The document may be generated by printing an original image on a printing medium. Printing may take place using a variety of technologies comprising thermal ink jet printing, piezo ink jet printing, laser printing or liquid electrophotographic printing (LEP) for example. The document may be obtained by printing on a printing media such as paper or some other form of planar substrate for example. An original digital image is printed to obtain the document. Such an original image may include text, graphs or pictures or a mixture thereof, for example. In some examples, the original digital image has a resolution of more than 500,000 pixels per square inch or more than 100000 pixels per square centimeter.

Figure 1B:
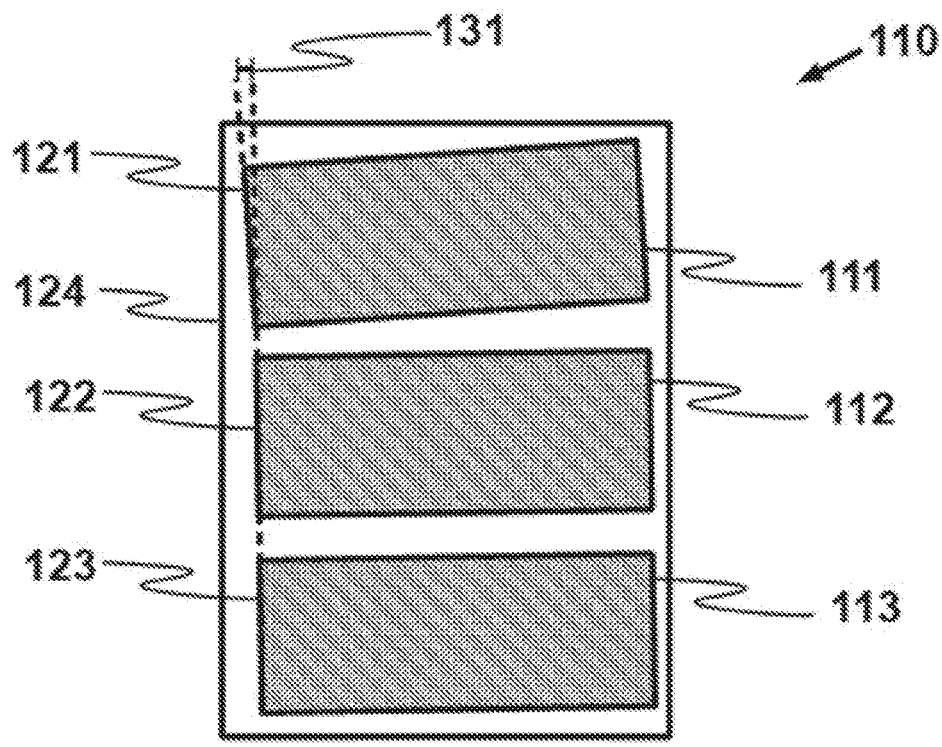

The method 100 also comprises in block 102 scanning the document to produce a digital representation, such as digital representation 110 illustrated on FIG. 1b, using an in line scanner of the printing system. An in line scanner may be placed directly following a printing station of the printing system, or may be placed further down a media path of the printing station. An in line scanner may be an integral element of the printing system, whereby every document printed is exposed to the in line scanner, even if not all documents may be effectively scanned by the scanner. An in line scanner may permit scanning any document printed by the printing system. An in line scanner may produce a digital representation having a resolution of for example about 12000 pixels per square inch or about 2000 pixels per square centimeter. An in line scanner may produce a digital representation having a resolution of less than about 20000 pixels per square inch or less than about 4000 pixels per square centimeter. In an example, the original digital image has a higher resolution than the digital representation. In an example, a file size of the original digital image is more than 10 times a file size of the digital representation. In an example, a resolution of the original digital image is more than 10 times a resolution of the digital representation. A higher resolution of an original digital image may increase the quality of a printed image while a relatively lower resolution of the digital representation may be sufficient to detect skew or misalignment without requiring a relatively high use of computing resources.

The method 100 also comprises in block 103 detecting skew in the digital representation 110 independently from the original digital image. Skew may be introduced if a printing media is placed in a crooked manner at a printing station level of the printing system, such that an original digital image is displaced compared to its ideal positioning on printing media. In an example, skew introduces to some degree a rotation of part or all of an original digital image when printed on a printing media. Digital representation 110 illustrates a document comprising three different parts corresponding in digital representation 110 to blocks 111, 112 an 113, or example three pictures, three labels or three paragraphs of text. The digital representation may be processed to detect characteristics of the digital representation, for example using contrast between neighboring pixels, leading for example to detecting lines such as lines 121, 122 and 123. Such lines may have for example their orientation compared to the edge of the digital representation, or compared to each other. In this example, while line 122 and 123 are aligned, line 121 is not aligned to either lines 122 or 123. One may measure the angle 131 between the line common to 122 and 123 and line 121, and detect that skew took place when printing block 111 for example, in another example, skew may be detected by detecting that either lines 121, 122 or 123 are not parallel to border 124 of the scanned area corresponding to the digital representation. Detecting skew independently from the original digital image may be done by comparing graphical characteristics of the digital representation to each other, for example by identifying characteristic lines being misaligned with a border of the digital representation, being for example parallel or perpendicular with a border of the digital representation. Detecting skew independently from the original digital image may be done by comparing a characteristic of the digital representation with a border of the digital representation.

Figure 2A:
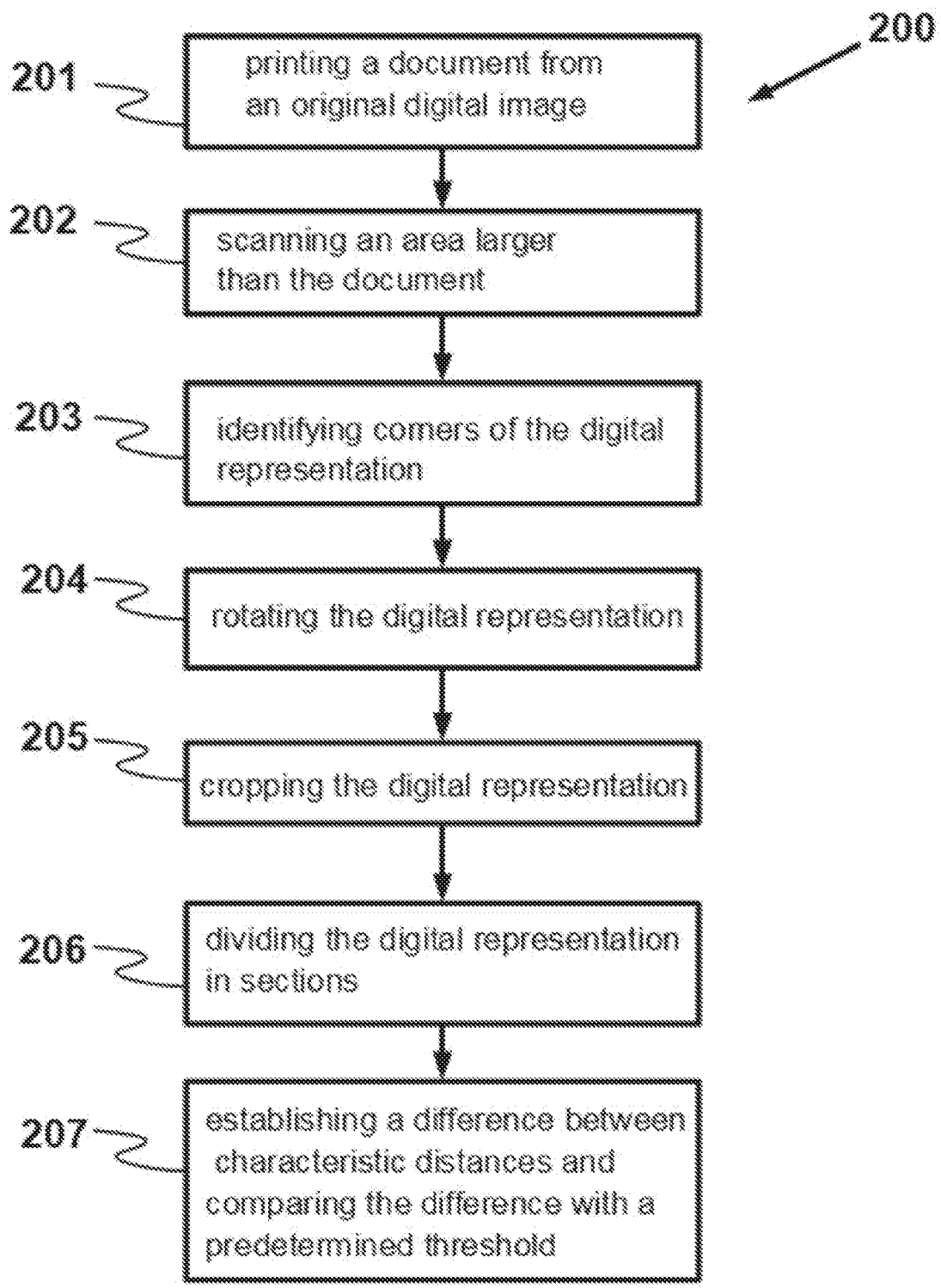
FIG. 2a is a schematic illustration of another example digital representation method according to the present disclosure.
Figure 2B:
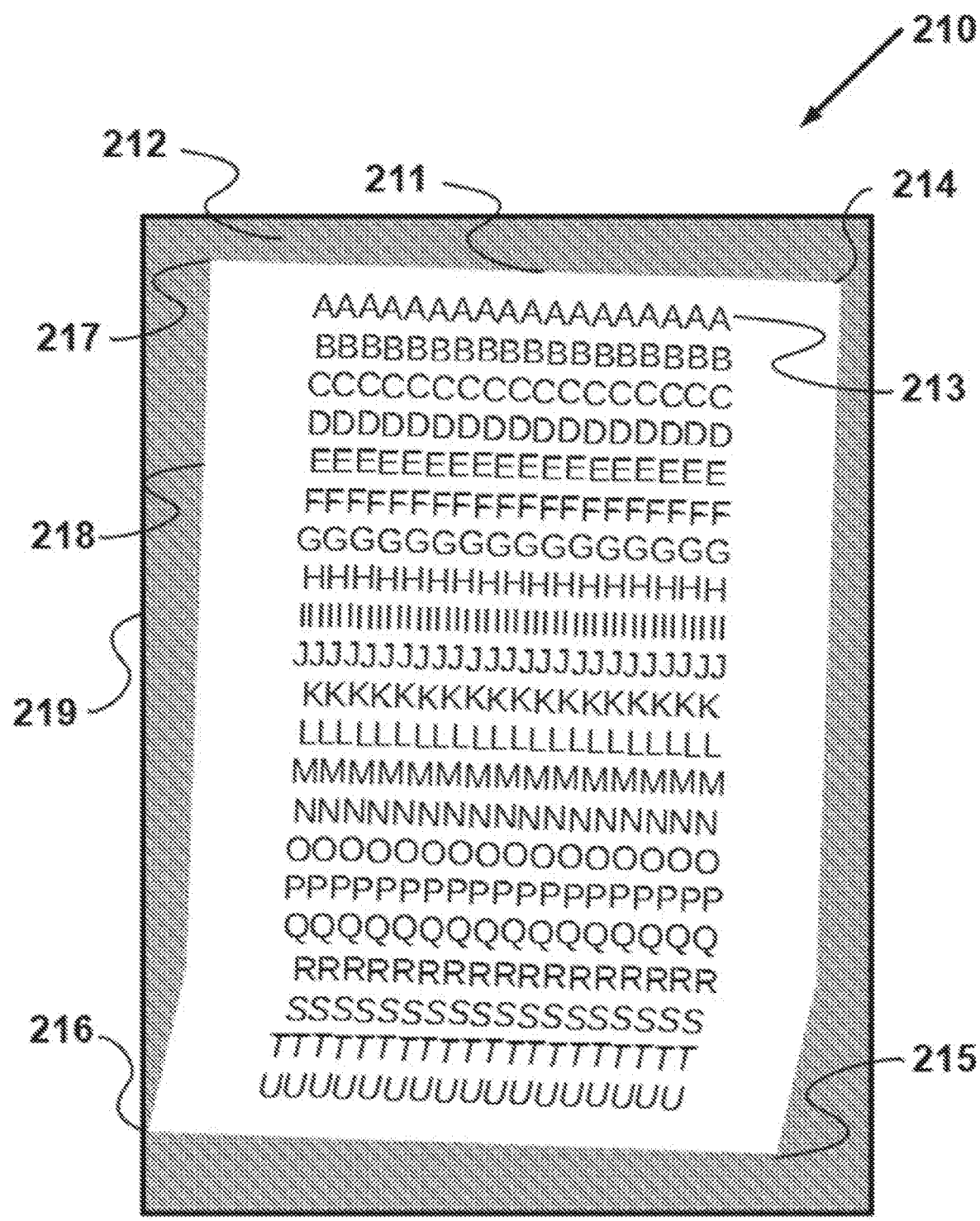

FIG. 2a illustrates another example method 200 for skew detection in a printing system. Its block 201, a document is printed from an original image. In block 202, the document is scanned to produce a digital representation such as digital representation 210 of FIG. 2b using an in line scanner of the printing system, whereby the scanning scans an area larger than the document, whereby the digital representation 210 comprises a digital representation of the document 211 and a digital representation of an area 212 outside of the document. Having the scanner scan an area larger than the document may contribute to permitting the detection of skew by comparing the position of a border 218 of digital representation of the document with a border 219 of the area scanned.

Method 200 comprises in block 203 identifying corner such as corners 214, 216, 216 and 217 of the digital representation 211 of the document. In an example, more than one corner is identified. In another example, exactly four corners are identified. In another example, more than 4 corners are identified. Such corners may for example be identified by evaluating a gradient between pixels, whereby a steep change of gradient along three cardinal directions indicate the location of a corner. Such identification of corners may participate in identifying characteristics of the digital representation 210 which may lead to evaluating skew independently from the original image, thereby avoiding consuming significant computing resources and time.

Figure 2C:
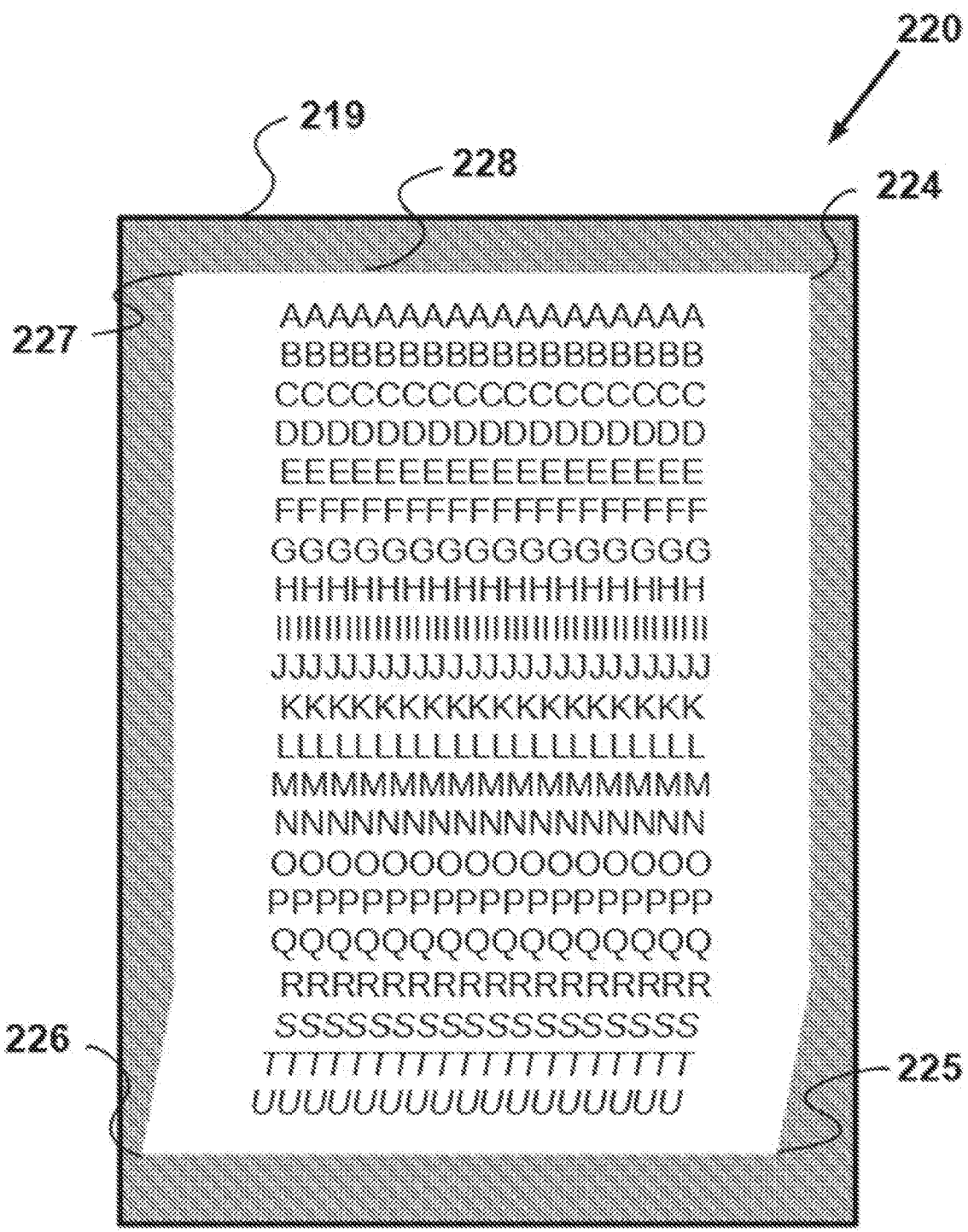

Method 200 comprises in block 204 rotating the digital representation 211 of the document to include a rotated digital representation 228 of the document in a modified digital representation 220 as illustrated in FIG. 2c, whereby two adjacent corners of the document in the modified digital representation 220, such as for example, 224 and 227 or 225 and 226, define a line 228 (if the corners are 224 and 227) aligned with a border 219 of the modified digital representation. In an example, the line joining the two adjacent corners corresponds to a line separating an area outside of the document and the digital representation of the document. In an example, the line aligned with a border is parallel to the border. An area outside of the document may be an area scanned by the scanner outside of the boundaries of the document. An area outside of the document may be a representation of a platen on which the document is located during the scan.

Figure 2D:
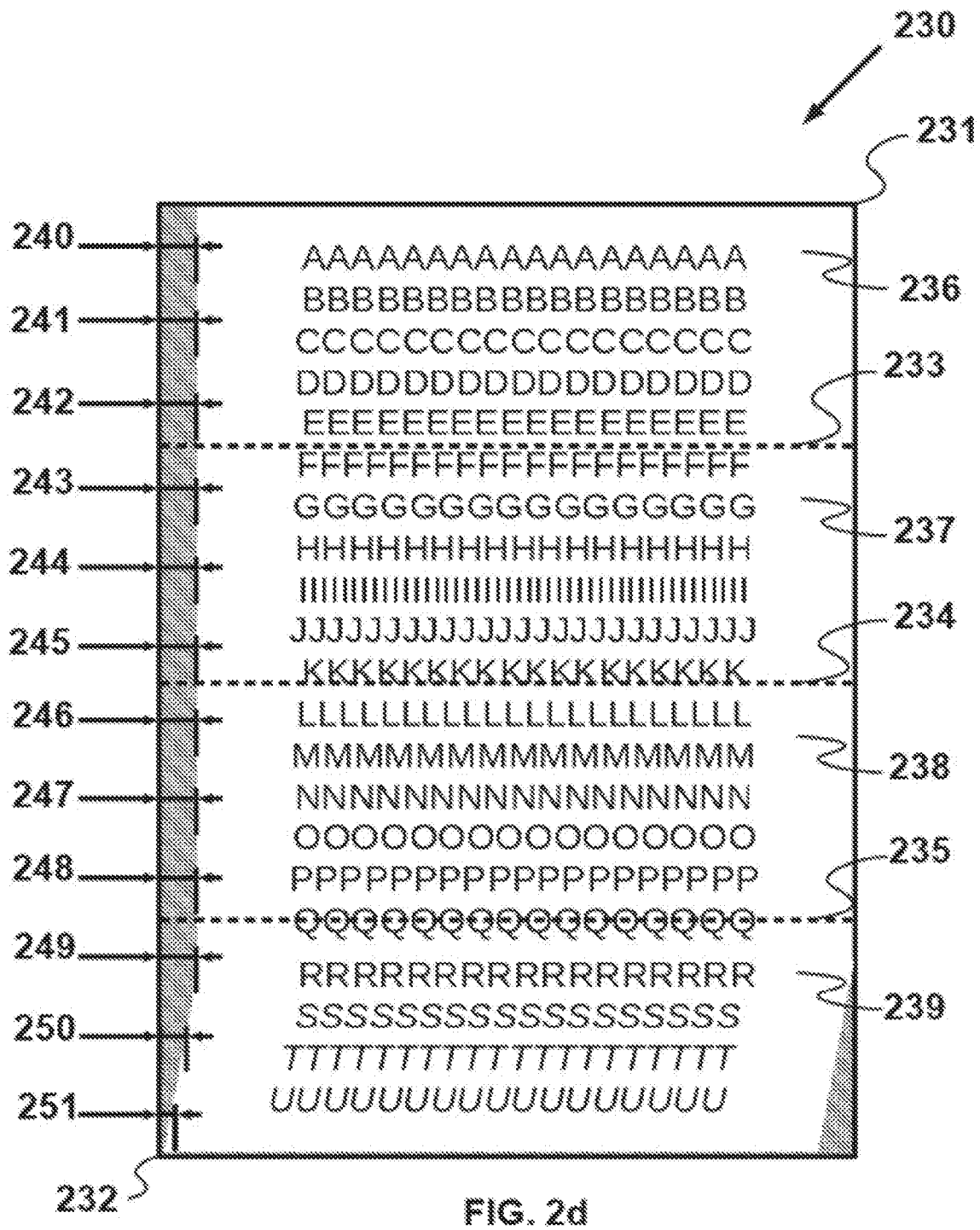

Method 200 comprises in block 205 cropping the digital representation of the document to include a cropped digital representation of the document in a modified representation, whereby corners of the document in the modified representation correspond to corners of the modified representation. In an example, as illustrated in FIG. 2d, such cropping may take place on the rotated digital representation 228 of the document in a further modified representation 230, whereby corners 231 and 232 of the document in the further modified representation 230 correspond to corners of the further modified representation 230. Such cropping may permit a zooming effect allowing to take more precise measurements when evaluating skew.

Method 200 comprises in block 206 dividing the digital representation in sections. In an example, such division in section is illustrated in FIG. 2d, whereby the digital representation is divided by parallel lines, in this case three parallel lines 233, 234 and 235, themselves being parallel to a border of the digital representation, dividing the digital representation in a corresponding number of sections, in this example four sections 236, 237, 238 and 239. In this example, the sections have a similar shape and area. In this example, the sections are rectangular. In this example, the sections cover the entire area of the digital representation. In an example, part of the digital representation is not comprised in a section and the sections cover when taken together a part of the entire area of the digital representation. In an example, sections are successively following each other in a direction of a media path, being for example separated by lines perpendicular to the direction of a media path. In an example, the method 200 may comprise measuring for each section a characteristic distance between a border of the digital representation and a border of a digital representation of the document. An example of such measuring is illustrated on FIG. 2d whereby a number or set of measurements 240 to 251 are illustrated. An example of a characteristic distance may for example be an average, median, maximum or minimum value of a set of measurements. A characteristic distance may for example correspond to a single measurement in a section. In an example, a digital representation may measure 1200 pixels along a media path direction, whereby the representation is divided in seven sections, the separation between sections being perpendicular to media path direction. In an example, a digital representation may measure more than 1000 pixels along a media path direction, whereby the representation is divided in more than 5 sections, the separation between sections being perpendicular to a media path direction.

Method 200 comprises block 207 establishing a difference between the characteristic distances and comparing the difference with a predetermined threshold. In the example illustrated on FIG. 2d, the difference between the characteristic distances may be a difference between each measurement and an average value of the measurements. In another example, the difference may be a difference between each measurement and a median value of the measurements. In such an example, such difference would be significantly higher for section 239 than for any of sections 236, 237 or 238, thereby permitting detecting the effect of skew in section 229, whereby the distance between the border of the representation of the document and the border of the digital representation varies. Using a comparison with a predetermined threshold may introduce some degree of flexibility, thereby avoiding false positive detection of skew. In an example, a median distance between the border of the representation of the document and the border of the digital representation is calculated for each section, as well as a maximal absolute difference from such median, whereby skew is detected if such a maximal absolute difference is more than 5% of the median distance for example. In an example, if a maximal absolute difference between measurements is of more than 5 pixel and if a maximal absolute difference of the measurements with the median value of the measurements is of more than 10 pixels, skew or misalignment is reported.

In an example, excessive skew is indicated to a control entity. Excessive skew may be determined for example through a predetermined threshold. Excessive skew may for example be linked to a probability of blocking a media path. A control entity may be a proactive control entity which would pause the operation of the printing system or may be a passive control entity indicating skewing to a user of the printing system, for example by way of a visual indicator or by way of a digital message.

Figure 3:
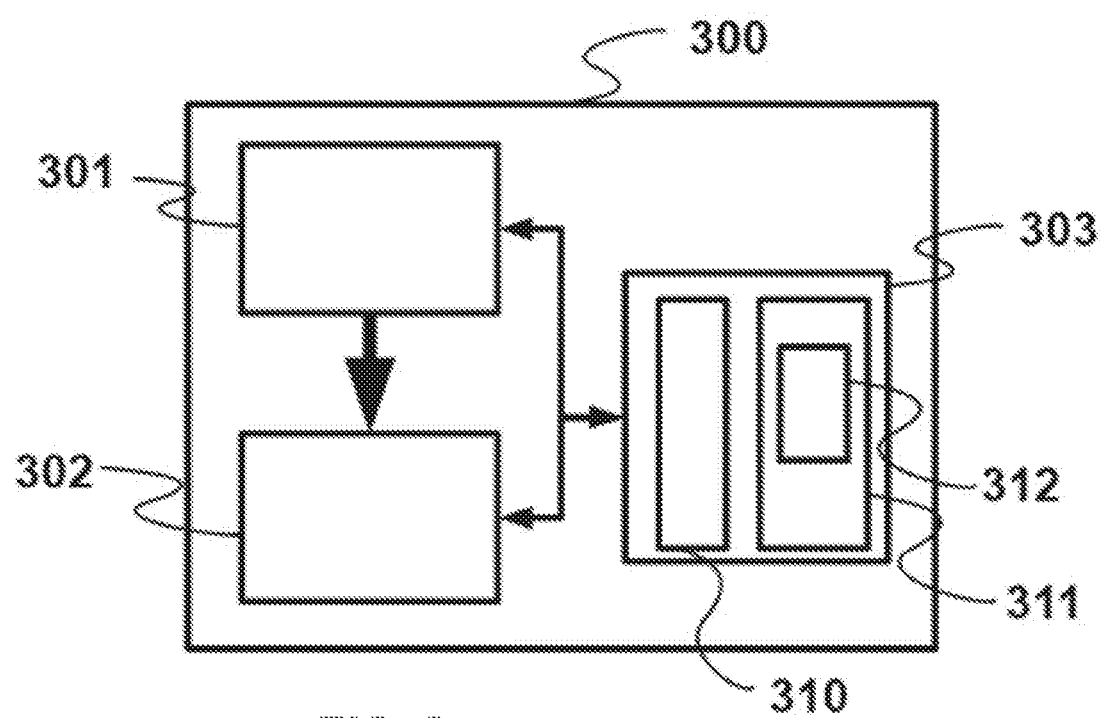
FIG. 3 is a block diagram of an example printing system according to the present disclosure.

FIG. 3 illustrates an example printing system 300 according to this disclosure. The printing system comprise a printer 301. Printer 301 may for example e a thermal ink jet printer, piezo ink jet printer, laser printer or LEP printer (LEP). The printing system 300 comprises a scanner 302 scanner permitting to create a digital representation of a document. Scanner 302 may for example include a camera. The printing system 300 comprises a controller 303.

In an example, controller 303 is an electronic controller which communicates with the printer and the scanner. In an example, the controller is an electronic controller which comprises a processor 310 and a memory or data storage 311 and possibly other electronic circuits for communication including receiving and sending electronic input and output signals. An example electronic controller may receive data from a host system, such as a computer, and may include memory for temporarily storing data. Data may be sent to an electronic controller along an electronic, infrared, optical or other information transfer path. The processor 310 may perform operations on data. In an example, the processor is an application specific processor, for example a processor dedicated to printer calibration, or to printing. The processor may also be a central processing unit. In an example, the processor comprises an electronic logic circuit or core and a plurality of input and output pins for transmitting and receiving data. The controller 303 comprises data storage 311. Data storage may include any electronic, magnetic optical, or other physical storage device that stores executable instructions. Data storage 311 may be, for example, Random Access Memory (RAM), an Electrically-Erasable Programmable Read-Only Memory (EEPROM), a storage drive, an optical disk, and the like. Data storage 311 is coupled to the processor 313.

The controller 303 comprises an instruction set 312. Instruction set 312 cooperates with the processor 310 and the data storage 311 in the example, instruction, set 312 comprises executable instructions for the processor 310, the executable instructions being encoded in data storage 311.

Instruction set 312 cooperates with the processor 310 and data storage 311 to print an original digital image with the printer 301 on a printing media to produce a document, to scan the document with the scanner 302 to produce a digital representation such as for example digital representation 110 or 210, and detect a misalignment of the printed document in the digital representation without taking the original digital image into account. A misalignment of the printed document in the digital representation may be detected by identifying characteristic lines in the digital representation, such lines corresponding for example to a gradient between the value of adjacent pixels of the digital representation, whereby an angle between such characteristic lines and reference lines such as for example reference lines corresponding to borders of the digital representation is evaluated, whereby such evaluated angle may indicate lack of parallelism or lack of perpendicularity for example, thereby indicating a misalignment. Detecting such misalignment without taking the original digital image into account may lower computing requirement, permitting a relative downsizing of the processor, data storage or of networking components, or permit faster operation of the processor, data storage or networking components.

In an example, instruction set 312 is to cooperate with the processor 310 and the data storage 311 to measure on the digital representation characteristic distances between a border of a digital representation of the document and a border of the scanning area. In an example, instruction set 312 is to cooperate with the processor 310 and the data storage 311 to measure on the digital representation characteristic distances between borders of a digital representation of the document and borders of the scanning area, whereby the characteristic distance is representative of an area which is outside of the document when the scan takes place.

In an example, the printing system comprises a media path, the media path configured to move the printing media from the printer to the scanner. In an example, the scanner is placed directly following the printer along the media path. In an example, media moves along the media path at a speed of 1 meters per second, in an example, media moves along the media path at a speed of more than 0.5 meters per second. In an example, the scanner scans 700,000 square millimeters per second. In an example, the scanner scans more than 500,000 square millimeters per second.

FIG. 3 illustrates a non-transitory machine-readable storage medium 311 encoded with instructions 312 executable by a processor such as processor 310, the machine-readable storage medium comprising instructions to print a document representing an original digital image; instructions to scan the document to capture a digital representation comprising a digital representation of the document; and instructions to detect a misalignment of the digital representation of the document in the digital representation based on measuring characteristic distances in the digital representation.

In an example, the measuring characteristic, distances comprises instructions to identify corners of the document in the digital representation; rotate and crop the digital representation of the document into a modified digital representation, whereby corners of the document correspond to corners of the modified digital representation; divide the modified representation in sections; and measure for each section a characteristic distance between a border of the modified digital representation and a border of the rotated and cropped digital representation of the document.

The preceding description has been presented to illustrate and describe certain examples Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method for skew detection in a printing system comprising:
   printing a document from an original digital image;
   scanning the document to produce a digital representation using an in line scanner of the printing system; and
   detecting skew in the digital representation independently from the original digital image,
   whereby detecting skew in the digital representation independently from the original digital image comprises:
      dividing the digital representation in sections, and
      measuring, for each section, a characteristic distance between a border of the digital representation and a border of a digital representation of the document.

2. A method according to claim 1, whereby the scanning scans an area larger than the document, whereby the digital representation comprises the digital representation of the document and a digital representation of an area outside of the document.

3. A method according to claim 2, whereby detecting skew in the digital representation independently from the original digital image comprises identifying corners of the digital representation of the document.

4. A method according to claim 3, whereby detecting skew in the digital representation independently from the original digital image comprises rotating the digital representation of the document to include a rotated digital representation of the document in a modified digital representation, whereby two adjacent corners of the document in the modified digital representation define a line aligned with a border of the modified digital representation.

5. A method according to claim 3, whereby detecting skew the digital representation independently from the original digital image comprises cropping the digital representation of the document to include a cropped digital representation of the document in a modified digital representation, whereby corners of the document in the modified digital representation correspond to corners of the modified digital representation.

6. A method according to claim 1 comprising establishing a difference between the characteristic distances and comparing the difference with a predetermined threshold.

7. A method according to claim 1 comprising indicating excessive skew to a control entity.

8. A method according to claim 1, whereby the origin digital image has a higher resolution than the digital representation.

9. A printing system comprising a printer, a scanner and a controller, the controller comprising a processor, a data storage coupled to the processor and an instruction set to cooperate with the processor and the data storage to:
    print an original digital image with the printer on a printing media to produce a document;
    scan the document with the scanner to produce a digital representation;
    detect a misalignment of the printed document in the digital representation without taking the original digital image into account; and
    measure on the digital representation characteristic distances between a border of a digital representation of the document and a border of a scanning area.

10. The printing system according to claim 9, whereby the system comprises a media path, the media path configured to move the printing media from the printer to the scanner.

11. A non-transitory machine-readable storage medium encoded with instructions executable by a processor, the machine-readable storage medium comprising:
    instructions to print a document representing an original digital image;
    instructions to scan the document to capture a digital representation comprising a digital representation of the document; and
    instructions to detect a misalignment of the digital representation of the document in the digital representation based on measuring characteristic distances in the digital representation,
    whereby the measuring characteristic distances comprises instructions to:
        identify corners of the document in the digital representation;
        rotate and crop the digital representation of the document into a modified digital representation, whereby corners of the document correspond to corners of the modified digital representation;
        divide the modified representation in sections;
        measure for each section a characteristic distance between a border of the modified digital representation and a border of the rotated and cropped digital representation of the document.

\* \* \* \* \*